(12) United States Patent
Casagrande (10) Patent No.: US 11,830,475 B2
(45) Date of Patent: Nov. 28, 2023

(54) PREDICTING SPECTRAL REPRESENTATIONS FOR TRAINING SPEECH SYNTHESIS NEURAL NETWORKS

(71) Applicant: DeepMind Technologies Limited, London (GB)

(72) Inventor: Norman Casagrande, London (GB)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 17/830,283

(22) Filed: Jun. 1, 2022

(65) Prior Publication Data

US 2022/0383851 A1    Dec. 1, 2022

Related U.S. Application Data

(60) Provisional application No. 63/195,635, filed on Jun. 1, 2021.

(51) Int. Cl.
| | | |
|---|---|---|
| *G10L 13/08* | (2013.01) | |
| *G10L 13/047* | (2013.01) | |
| *G10L 25/18* | (2013.01) | |
| *G10L 25/30* | (2013.01) | |

(52) U.S. Cl.
CPC ............ *G10L 13/047* (2013.01); *G10L 13/08* (2013.01); *G10L 25/18* (2013.01); *G10L 25/30* (2013.01)

(58) Field of Classification Search
CPC .................................................... G10L 13/08
See application file for complete search history.

(56) References Cited

U.S. PATENT DOCUMENTS

| 11,694,674 B1 * | 7/2023 | Abbas ..................... G10L 13/08 704/260 |
| 2019/0251952 A1 * | 8/2019 | Arik ........................ G10L 13/08 |

FOREIGN PATENT DOCUMENTS

| EP | 3593290 B1 * | 1/2022 | ............... G06N 3/04 |

OTHER PUBLICATIONS

International Search Report and Written Opinion in International Appln. No. PCT/EP2022/064925, dated Oct. 13, 2022, 13 pages.

(Continued)

*Primary Examiner* — Shreyans A Patel
(74) *Attorney, Agent, or Firm* — Fish & Richardson P.C.

(57) ABSTRACT

Methods, systems, and apparatus, including computer programs encoded on computer storage media, for training a neural network to perform speech synthesis. One of the methods includes obtaining a training data set for training a first neural network to process a spectral representation of an audio sample and to generate a prediction of the audio sample, wherein, after training, the first neural network obtains spectral representations of audio samples from a second neural network; for a plurality of audio samples in the training data set: generating a ground-truth spectral representation of the audio sample; and processing the ground-truth spectral representation using a third neural network to generate an updated spectral representation of the audio sample; and training the first neural network using the updated spectral representations, wherein the third neural network is configured to generate updated spectral representations that resemble spectral representations generated by the second neural network.

20 Claims, 4 Drawing Sheets

(56) References Cited

OTHER PUBLICATIONS

Juvela et al., "GELP: GAN-Excited Linear Prediction for Speech Synthesis from Mel-spectrogram," CoRR, Apr. 2019, arxiv.org/abs/1904.03976, 5 pages.

Salimans et al., "PixelCNN++: Improving The PixelCNN With Discretized Logistic Mixture Likelihood And Other Modifications," CoRR, Jan. 2017, arXiv:1701.05517, 10 pages.

Shen et al., "Natural TTS Synthesis by Conditioning WaveNet on Mel Spectrogram Predictions," 2018 IEEE International Conference on Acoustics, Speech and Signal Processing (ICASSP), Apr. 2018, 5 pages.

Shen et al., "Non-Attentive Tacotron: Robust and Controllable Neural TTS Synthesis Including Unsupervised Duration Modeling," CoRR, Oct. 2020, arxiv.org/abs/2010.04301, 14 pages.

\* cited by examiner

PREDICTING SPECTRAL REPRESENTATIONS FOR TRAINING SPEECH SYNTHESIS NEURAL NETWORKS

CROSS-REFERENCE TO RELATED APPLICATION

This application claims priority to U.S. Provisional Application No. 63/195,635, filed on Jun. 1, 2021. The disclosure of the prior application is considered part of and is incorporated by reference in the disclosure of this application.

BACKGROUND

This specification relates to generating audio data using neural networks.

Neural networks are machine learning models that employ one or more layers of nonlinear units to predict an output for a received input. Some neural networks include one or more hidden layers in addition to an output layer. The output of each hidden layer is used as input to one or more other layers in the network, i.e., one or more other hidden layers, the output layer, or both. Each layer of the network generates an output from a received input in accordance with current values of a respective set of parameters.

SUMMARY

This specification describes a system implemented as computer programs on one or more computers in one or more locations that is configured to train a neural network to generate audio samples using predicted spectral representations of the audio samples.

In this specification, a spectral representation of an audio sample is a representation of a spectrum of frequencies of the audio sample, as the spectrum of frequencies varies over time. For example, at each of multiple time points in the audio sample, the spectral representation can include a respective amplitude value for each frequency in a predetermined set of frequencies. In this specification, a spectrogram is a visual representation of the spectral representation of an audio sample. For example, a spectrogram can be a two dimensional image with time varying along one axis and frequency varying along another axis; for each element (e.g., pixel) in the image, the spectrogram can include a visual representation of the amplitude value of the corresponding frequency at the corresponding time, e.g., a color that represents the amplitude value from a range of colors representing a range of corresponding possible amplitude values.

After the neural network (sometimes called a "vocoder" neural network herein) has been trained, the vocoder neural network can be deployed in a speech synthesis system that includes a second neural network (sometimes called a "spectral representation" neural network herein) that is configured to process a text input and to generate a predicted spectral representation of a verbalization (or vocalization) of the text input. The vocoder neural network can then obtain the predicted spectral representation generated by the spectral representation neural network, and process the predicted spectral representation to generate an audio sample of the verbalization of the text input. Thus, the speech synthesis system is configured to receive a system input that includes a conditioning text input that characterizes a text sequence. The speech synthesis system can process the conditioning text input to generate audio data corresponding to the input text, i.e., audio data characterizing a speaker speaking the input text.

In some implementations, the spectral representation neural network can require a significant amount of time and computational resources to be trained to generate a predicted spectral representation for a particular voice or type of voice. That is, in these implementations, to generate a predicted spectral representation of an audio sample in which a particular voice verbalizes the text input, the spectral representation neural network must be trained specifically for the particular voice. This training process also often requires a significant amount of training data corresponding to the particular voice, i.e., ground-truth audio samples of the particular voice verbalizing different text inputs. However, a large corpus of training data is often unavailable for any but a few voices. Therefore, in some such implementations, the spectral representation neural network is only trained on a few voices (e.g., 3, 5, 10, 20, 50, or 100 voices), i.e., is only able to generate predicted spectral representations of audio samples verbalized by those voices.

The vocoder neural network, on the other hand, can be trained universally across voices. That is, a training system is not required to train the vocoder neural network for each different voice separately, but rather can use a training set that includes training examples (e.g., pairs of ground-truth audio samples and corresponding spectral representation inputs) corresponding to multiple voices to train vocoder neural network concurrently for the multiple voices. Thus, the training set can include training examples corresponding to relatively rare voices, even if the training system only has access to a few such training examples. In fact, in some implementations, e.g., if the vocoder neural network is trained on a wide enough variety of voices, the vocoder neural network can be configured to be able, after training has completed, to receive a spectral representation corresponding to a new voice that was not in the training data set and generate an accurate audio sample for the new voice.

Given a corpus of audio samples, a training system can generate ground-truth spectral representations of the audio samples, e.g., by processing the audio samples using bandpass filters or a Fourier transform. However, providing ground-truth spectral representations as training inputs to the vocoder neural network during training can yield suboptimal results after the vocoder neural network is deployed, because the vocoder neural network does not receive ground-truth spectral representations at inference time. Rather, the vocoder neural network receives predicted spectral representations that have been generated by the spectral representation neural network. Although the spectral representation neural network can be trained to generate highly accurate predicted spectral representations, nevertheless these predicted spectral representations are not perfect, and can have subtle differences from the corresponding ground-truth spectral representations. When training a neural network, it is important to provide training inputs that match what the neural network will receive at inference time.

Thus, the training system for the vocoder neural network has two conflicting requirements. First, the vocoder neural network must receive training inputs that match the inputs that will be received after deployment; that is, the vocoder neural network must either receive spectral representations that have been generated by the spectral representation neural network or receive spectral representations that closely resemble the predicted spectral representations generated by the spectral representation neural network. Second, the vocoder neural network must receive training inputs corresponding to a wide variety of different voices, which the spectral representation neural network may be unable to generate because of the limitations described above.

Using techniques described in this specification, a training system can generate training inputs for the vocoder neural network by processing ground-truth spectral representations of audio samples using a third neural network (sometimes called a "perturbation" neural network herein) to generate updated spectral representations (sometimes called "perturbed" spectral representations herein) of the audio samples. The perturbed spectral representations are similar to the predicted spectral representations generated by the spectral representation neural network, and therefore are appropriate training inputs for the vocoder neural network. In other words, the perturbation neural network can be configured to process ground-truth spectral representations and to generate perturbed spectral representations that have the same characteristics as those generated by the spectral representation neural network. The training system can then use the perturbed spectral representations, along with the corresponding ground-truth audio samples, to perform supervised training of the vocoder neural network. After training is complete, the vocoder neural network can be deployed with the spectral representation neural network as described above; that is, typically the perturbation neural network is not deployed in the speech synthesis system at inference time.

In some implementations, the perturbation neural network is explicitly trained to generate perturbed spectral representations that mimic the predicted spectral representations generated by the spectral representation neural network. In some other implementations, the perturbation neural network is not explicitly trained to generate perturbed spectral representations in this way. For example, the perturbation neural network can be an autoencoder neural network that is configured to process a ground-truth spectral representation and generate an embedding of the ground-truth spectral representation, then reconstruct the spectral representation using the embedding. The predicted spectral representations generated by the spectral representation neural network can more closely resemble the reconstructed spectral representations generated by the perturbation neural network than the corresponding ground-truth spectral representations, and thus the reconstructed spectral representations can be used as the perturbed spectral representations during the training of the vocoder neural network.

The subject matter described in this specification can be implemented in particular embodiments so as to realize one or more of the following advantages. Many existing speech synthesis systems are limited to generating audio samples characterizing one or a few predetermined voices. Using techniques described in this specification, a training system can train a vocoder neural network to be truly universal, i.e., to be able to generate audio samples characterizing any voice, even voices that were not represented in the training data set for the vocoder neural network. In some implementations, the trained vocoder neural network can be deployed with any one of multiple different spectral representation neural networks (e.g., even spectral representation neural networks that were trained after the training and deployment of the vocoder neural network) and generate high-quality audio samples when receiving spectral representations from any of them.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system that trains a neural network to generate audio samples using predicted spectral representations of the audio samples.

Figure 1:
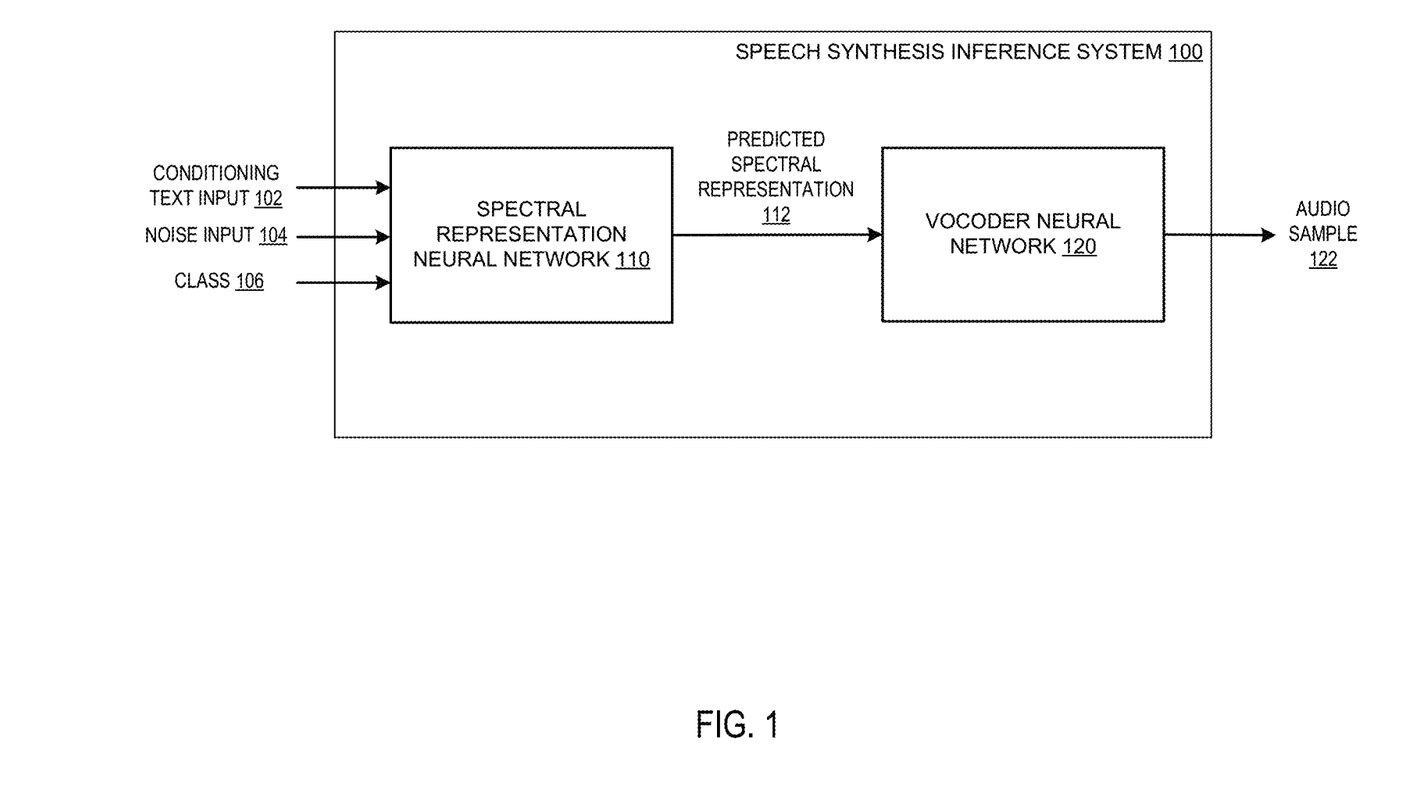
FIG. 1 is a diagram of an example speech synthesis inference system.

FIG. 1 is a diagram of an example speech synthesis inference system 100 for generating audio samples 122. The speech synthesis inference system 100 is an example of a system implemented as computer programs on one or more computers in one or more locations, in which the systems, components, and techniques described below can be implemented.

The speech synthesis inference system 100 is configured to process a conditioning text input 102 to generate an audio sample 122. The conditioning text input 102 represents an input text, and the audio sample 122 represents speech corresponding to the input text. That is, the audio sample 122 represents a verbalization of the input text that is represented by the conditioning text input 102.

The conditioning text input 102 includes a sequence of input elements representing the input text. In some implementations, the conditioning text input 102 includes an embedding of the input text at a particular resolution; e.g., the sequence of input elements can be character-level, phoneme-level, or word-level embeddings of the input text. Instead or in addition, the conditioning text input 102 can include linguistic features characterizing the input text. For example, the sequence of input elements can include a respective vector of linguistic features for each input time step in a sequence of input time steps corresponding to the input text. As a particular example, the linguistic features for each input time step can include one or more of: i) a phoneme, ii) a duration of the text at the input time step, or iii) pitch information, e.g., the pitch at the input time step as represented by a logarithmic fundamental frequency log $F_0$ of the input time step.

The conditioning text input 102 can be obtained from any appropriate source. For example, the speech synthesis inference system 100 can be a component of a virtual assistant that interacts with users to answer questions and/or execute tasks, and the conditioning text input 102 can be a text response generated by the virtual assistant in response to a query submitted by a user. The speech synthesis inference system 100 can then generate an audio sample 122 that is a verbalization of the text response and cause the audio sample 122 to be played to the user. As another example, the conditioning text input 102 can be text from a book (or other written media such as a newspaper or magazine), and the speech synthesis inference system 100 can be configured to generate an audio sample 122 that is a verbalization of the book to be played to users (e.g., an audiobook corresponding to the book). As another example, the speech synthesis inference system 100 can be a component of a system that receives text inputs 102 from users and provides audio samples 122 that are verbalizations of the text inputs 102 to the users, e.g., a system that provides accessibility for users who cannot speak or have difficulty speaking.

In some implementations, the speech synthesis inference system 100 also receives as input a noise input 104. For example, the noise input 104 can be randomly sampled from a predetermined distribution, e.g., a Normal distribution. The noise input 104 can ensure variability in the audio sample 122 generated by the speech synthesis inference system 100.

In some implementations, the speech synthesis inference system 100 also receives as input an identification of a class 106 to which the audio sample 122 should belong. The class 106 can be a member of a set of possible classes. For example, the class 106 can correspond to a particular speaker (from a set of possible speakers) that the audio sample 122 should sound like. That is, the audio sample 122 can represent the input text being spoken by the particular speaker. As a particular example, the class 106 can be represented by a one-hot vector, i.e., a vector in which each element corresponds a respective class from the set of possible classes and the element corresponding to the class 106 is equal to one while the rest of the elements are equal to zero.

The audio sample 122 can include a sample of an audio wave at each output time step in a sequence of output time steps. For example, the audio sample 122 can include, for each output time step, an amplitude value of the audio wave. In some implementations, the amplitude value is a raw amplitude value; in some other implementations, the amplitude value is compressed, companded, or both.

Generally, the sequence of input time steps and the sequence of output time steps characterize the same period of time (i.e., the duration of the vocalization of the input text), e.g., 1, 2, 5, or 10 seconds. However, in some cases there can be a different number of input time steps and output time steps. As a particular example, if the period of time is 2 seconds, then the conditioning input 102 can include 400 input time steps (resulting in a frequency of 200 Hz), while the audio sample 122 can include 48,000 time steps (resulting in a frequency of 24 kHz). Thus, the speech synthesis inference system 100 can generate audio samples for multiple output time steps (in this case, 120) for each input time step.

The speech synthesis inference system 100 includes two trained neural networks: a spectral representation neural network 110 and a vocoder neural network 120. The speech synthesis inference system 100 is called an "inference" system because the spectral representation neural network 110 and the generated neural network 120 have already been trained, and thus the speech synthesis inference system 100 can be deployed, e.g., in a production setting. That is, the operations of the speech synthesis inference system 100 can be implemented on a device or a system of devices for performing inference, i.e., receiving new inputs and processing the new inputs to generate corresponding outputs.

In some implementations, the speech synthesis inference system 100 can be deployed onto a cloud system, i.e., a distributed computing system having multiple computing nodes, e.g., hundreds or thousands of computing nodes, in one or more locations. In some other implementations, the speech synthesis inference system 100 can be deployed onto a user device, e.g., a mobile phone, a tablet computer, a smart device, or other edge computing device.

The spectral representation neural network 110 is configured to process the conditioning text input 102 (and, optionally, the noise input 104 and/or the representation of the class 106) to generate a predicted spectral representation 112 of the audio sample 122.

The spectral representation 112 can be any appropriate representation of the audio sample 122. For example, the spectral representation 112 can be an unnormalized spectral representation of the audio sample, a mel-frequency spectral representation of the audio sample, or a mel-frequency cepstral coefficient (MFCC) representation of the audio sample.

For example, the spectral representation neural network 110 can include one or more recurrent neural network layers that process the sequence of input elements of the conditioning text input 102 recurrently over multiple processing time steps. Instead or in addition, the spectral representation neural network 110 can include one or more one-dimensional convolutional neural network layers that are configured to process the sequence of input elements of the conditioning text input 102 using a convolutional kernel. Instead or in addition, the spectral representation neural network 110 can include one or more neural network layers that apply a self-attention mechanism to the sequence of input elements of the conditioning text input 102, e.g., one or more Transformer neural network layers.

A particular example of a spectral representation neural network and vocoder neural network is discussed in more detail in "Natural TTS Synthesis by Conditioning WaveNet on Mel Spectrogram Predictions," (arXiv:1712.05884), the contents of which are hereby incorporated by reference.

Another particular example of a spectral representation neural network and vocoder neural network is discussed in more detail in "Non-Attentive Tacotron: Robust and Controllable Neural TTS Synthesis Including Unsupervised Duration Modeling" (arXiv:2010.04301), the contents of which are hereby incorporated by reference.

As discussed above, in some implementations, the spectral representation neural network 110 requires a significant amount of training time, significant computational resources, and/or a large number of training examples to learn to generate a predicted spectral representation 112 that characterizes a given speaker's vocalization of the conditioning text input 102.

The vocoder neural network 120 is configured to process the predicted spectral representation 112 and to generate the audio sample 122. In some implementations, the vocoder neural network 120 is "universal." That is, the vocoder neural network 120 has been configured through training to generate an audio sample 122 using a predicted spectral representation 112 corresponding to any speaker, even speakers that were not represented in the training data set for the vocoder neural network 120.

In some implementations, after the vocoder neural network 120 generates the audio sample 122, the speech synthesis inference system 100 can cause the audio sample 122 to be played for a user, e.g., by providing the audio sample to an audio system of a user device of the user. For example, the speech synthesis inference system 100 can be a component of a virtual assistant that interacts with users to answer questions and/or execute tasks. As a particular example, the user can submit a query, the virtual assistant can generate a text response to the query, and the speech synthesis inference system can generate an audio sample 122 that is a verbalization of the text response and cause the audio sample 122 to be played to the user.

Instead or in addition, the speech synthesis inference system 100 can provide the audio sample 122 to an external system for storage or further processing.

In some implementations, the spectral representation neural network 110 and the vocoder neural network 120 are trained separately. For example, the spectral representation neural network 110 can be trained using training examples that each include i) a training conditioning text input and ii) a ground-truth audio sample. The predicted spectral representation generated from the training conditioning text input of a particular training example can be processed using a reconstruction algorithm to directly generate a predicted audio sample, e.g., processed using the Griffin-Lim reconstruction algorithm. The training system can then determine an update to the parameters of the spectral representation neural network 110 using a difference between i) the predicted audio sample generated using the reconstruction and ii) the ground-truth audio sample of the particular training example. As another example, the spectral representation neural network 110 can be trained using training examples that each include i) a training conditioning text input and ii) a ground-truth spectral representation generated from a ground-truth audio sample. The training system can then determine an update to the parameters of the spectral representation neural network 110 using a difference between i) the predicted spectral representation generated from the training conditioning text input of a particular training example and ii) the ground-truth spectral representation of the particular training example.

In implementations in which the spectral representation neural network 110 and the vocoder neural network 120 are trained separately, the vocoder neural network 120 can be trained using the training system 200 described below with reference to FIG. 2.

In some other implementations, the spectral representation neural network 110 and the vocoder neural network 120 are trained jointly. That is, a training system can obtain training examples that each include i) a training conditioning text input and ii) a ground-truth audio sample. The training system can process a training conditioning text input end-to-end using the spectral representation neural network 110 and the vocoder neural network 120 to generate a training audio sample, and determine an error between the training audio sample and the corresponding ground-truth audio sample. The training system can then backpropagate the error through both the vocoder neural network 120 and the spectral representation neural network 110 to determine a parameter update for both neural networks, e.g., using gradient descent.

In implementations in which the spectral representation neural network 110 and the vocoder neural network 120 are trained jointly, the vocoder neural network 120 can then be fine-tuned (i.e., the parameters of the vocoder neural network 120 can be updated) using the training system 200 described below with reference to FIG. 2.

Figure 2:
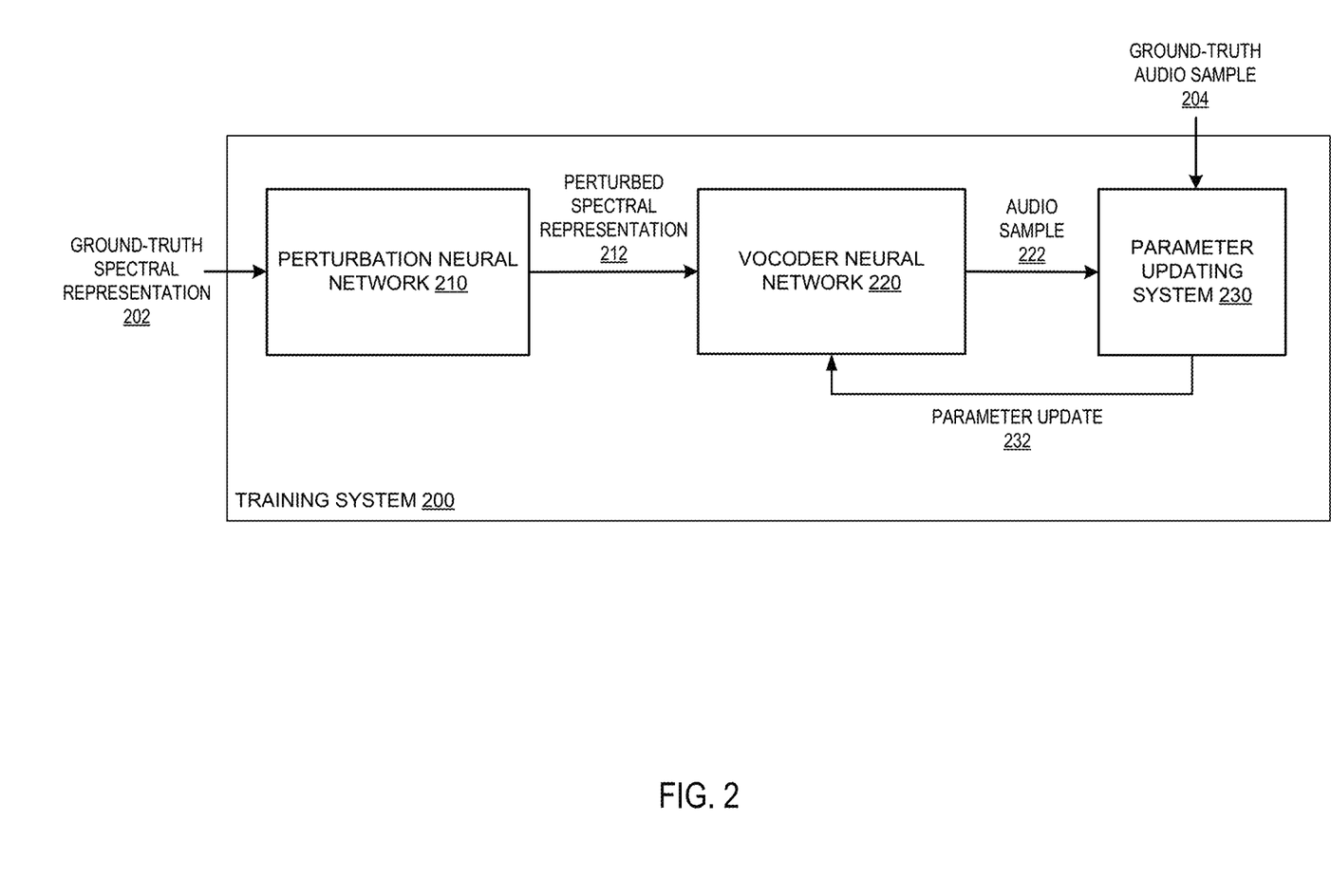
FIG. 2 is a diagram of an example training system.

FIG. 2 is a diagram of an example training system 200. The training system 200 is an example of a system implemented as computer programs on one or more computers in one or more locations, in which the systems, components, and techniques described below can be implemented.

The training system 200 is configured to train a vocoder neural network 220 to process spectral representations of audio samples and to generate predictions of the corresponding audio samples. For example, the vocoder neural network 220 can be configured similarly to the vocoder neural network 120 described above with reference to FIG. 1. After training, the vocoder neural network 220 can be deployed in a speech synthesis system with a spectral representation neural network, e.g., the spectral representation neural network 110 depicted in FIG. 1.

The training system 200 includes the vocoder neural network 220, a perturbation neural network 210, and a parameter updating system 230.

The perturbation neural network 210 is configured to process a ground-truth spectral representation 202 of an audio sample and to generate a perturbed spectral representation 212 of the audio sample. The training system 200 can then use the perturbed spectral representation 212 as a training input for the vocoder neural network 220.

As described above, during training of the vocoder neural network 220, providing the vocoder neural network 220 with inputs that match, or are similar to, the inputs that the vocoder neural network 220 will see at inference time can improve training, e.g., as measured by training accuracy or testing accuracy after training is completed. Thus, the perturbation neural network 210 can be configured to generate perturbed spectral representations 212 that are similar to the predicted spectral representations generated by the spectral representation neural network with which the vocoder neural network 220 is to be deployed.

In some implementations, the perturbation neural network 210 can be explicitly trained to generate perturbed spectral representations 212 that mimic the predicted spectral representations generated by the spectral representation neural network. For example, a training system for the perturbation neural network 210 (e.g., the training system 200 or a different training system) can obtain training examples that each include i) a ground-truth spectral representation 202 of an audio sample representing a verbalization of a text input and ii) a predicted spectral representation generated by the spectral representation neural network in response to processing the text input. The training system can then process the ground-truth spectral representation 202 using the perturbation neural network 210 to generate a perturbed spectral representation 212, and determine an update to the parameters of the perturbation neural network 210 according to an error between i) the perturbed spectral representation 212 and ii) the predicted spectral representation generated by the spectral representation neural network.

In other words, the training system can train the perturbation neural network 210 using training examples corresponding to voices for which the spectral representation neural network has been trained. Then, after the perturbation neural network 210 has been trained, the perturbation neural network 210 can generate perturbed spectral representations 212 that (i) correspond to voices for which the spectral representation neural network has not been trained but (ii) still resemble predicted spectral representations that would be generated by the spectral representation neural network. Thus, the vocoder neural network 220 can be trained using a more diverse training set than could be generated using the spectral representation neural network alone.

In some other implementations, the perturbation neural network 210 is not explicitly trained to generate perturbed spectral representations 212 that mimic the predicted spectral representations generated by the spectral representation neural network. For example, the perturbation neural network 210 can be an autoencoder neural network that is configured to process a ground-truth spectral representation 202 and generate an embedding of the ground-truth spectral representation 202, then reconstruct the ground-truth spectral representation 202 (i.e., generate a reconstructed spectral representation that is a prediction of the ground-truth spectral representation 202) using the embedding.

The reconstructed spectral representation can be considered a perturbed spectral representation 212 because the embedding generally cannot encode all the information of the ground-truth spectral representation 202, and thus the reconstruction process loses information from the ground-truth spectral representation 202. The reconstructed spectral representation can be more similar to the predicted spectral representations generated by the spectral representation neural network than the ground-truth spectral representation 202 is to the predicted spectral representations generated by the spectral representation neural network, and thus the reconstructed spectral representation can be a more suitable training input for the vocoder neural network 220 than the ground-truth spectral representation 202. An example autoencoder neural network that can be used to generate training inputs for a vocoder neural network is discussed in more detail below with reference to FIG. 3.

The vocoder neural network 220 can process the perturbed spectral representation 212 to generate an audio sample 222, and provide the audio sample to the parameter updating system 230. The parameter updating system 230 can also obtain a ground-truth audio sample 204 that corresponds to the ground-truth spectral representation 202. That is, the ground-truth spectral representation 202 has been generated from the ground-truth audio sample 204, e.g., by processing the ground-truth audio sample 204 using band-pass filters or a Fourier transform.

Thus, the training system 200 can generate a large training data set for the vocoder neural network 220 by obtaining ground-truth audio samples 204 characterizing a wide variety of different voices, processing the ground-truth audio samples 204 to generate corresponding ground-truth spectral representations 202, and then processing the ground-truth spectral representations 202 using the perturbation neural network 210 as described above.

The parameter updating system 230 can determine an update 232 to the network parameters of the vocoder neural network 220 using a difference between the generated audio sample 222 and the ground-truth audio sample 204. For example, the parameter updating system 230 can determine the L1 or L2 distance between the generated audio sample 222 and the ground-truth audio sample 204, or squared versions thereof. As another example, the parameter updating system 230 can determine the root mean squared error between the generated audio sample 222 and the ground-truth audio sample 204. As another example, the parameter updating system 230 can generate the update 232 according to a discretized logistic mixture likelihood, e.g., as described in "PixelCNN++: Improving The PixelCNN With Discretized Logistic Mixture Likelihood And Other Modifications," Salimans et al., arXiv:1701.05517.

The parameter updating system 230 can then backpropagate the error through the vocoder neural network 220 to generate the parameter update 232, e.g., using gradient descent. The parameter updating system 230 can also use any appropriate optimizer, e.g., the Adam optimizer or Adaptive Gradients (AdaGrad).

In this way, the training system 200 can train the vocoder neural network 220 to generate audio samples 222 for a wide variety of different speakers. For example, the training system can use ground-truth audio samples 204 characterizing speakers who speak with high or low pitch, speakers who use vocal fry, speakers with various accents, speakers who speak with high or low tempo, speakers with nasal voices, speakers who are whispering, etc. Thus, the vocoder neural network 220 can be trained to better handle new inputs (i.e., spectral representations representing new speaking characteristics) that may be received after deployment at inference time.

In some implementations, the training system 200 uses the perturbation neural network 210 to generate perturbed spectral representations 212 of audio samples that do not have a corresponding text input. That is, if a text transcription of an audio sample is unavailable, then the spectral representation neural network (which is configured to process the text input) cannot generate a predicted spectral representation that could be used as a training input for the vocoder neural network 220. Thus, the training system 200 can generate a ground-truth spectral representation 202 using the audio sample as described above, and process the ground-truth spectral representation 202 using the perturbation neural network 210 to generate a training input for the vocoder neural network.

In some implementations, instead of providing the perturbed spectral representation 212 directly to the vocoder neural network 220 after the perturbed spectral representation 212 is generated, as depicted in FIG. 2, the training system 200 can store the perturbed spectral representation 212 for training the vocoder neural network 220 at a future time point. That is, the training system 200 can execute (i) the perturbation neural network 210 and (ii) the training of the vocoder neural network 220 asynchronously. For example, the training system 200 can generate a training set for the vocoder neural network 220 by processing multiple ground-truth spectral representations 202 using the perturbation neural network to generate corresponding perturbed spectral representations, and then at a future time point use the generated training set to train the vocoder neural network 220.

In some implementations, an external system executes the perturbation neural network 210 to generate the perturbed spectral representation 212, and provides the perturbed spectral representation 212 to the training system 200 for training the vocoder neural network 220. That is, in these implementations the training system 200 does not include the perturbation neural network 210.

In some implementations, the training system 200 is executed on a single device, e.g., a graphics processing unit (GPU) or a tensor processing unit (TPU). That is, the perturbation neural network 210, the vocoder neural network 220, and the parameter updating system 230 can be executed on the same device. In some other implementations, the execution of the training system 200 is distributed across multiple devices. For example, the perturbation neural network 210 can be executed using one or more first devices, and the vocoder neural network 220 and parameter updating system 230 can be execute using one or more second devices.

Figure 3:
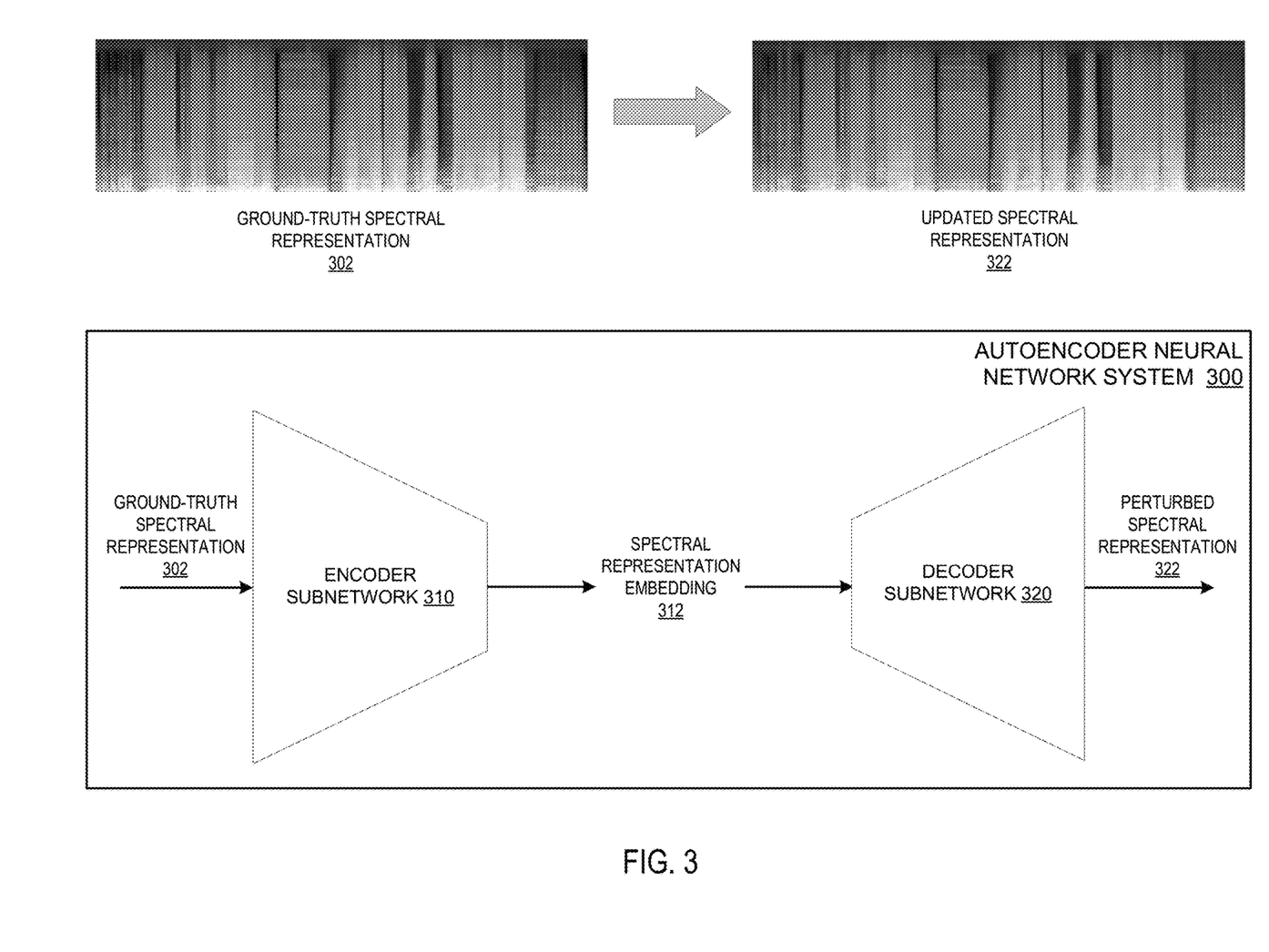
FIG. 3 is a diagram of an example autoencoder neural network system.

FIG. 3 is a diagram of an example autoencoder neural network system 300. The autoencoder neural network system 300 is an example of systems implemented as computer programs on one or more computers in one or more locations, in which the systems, components, and techniques described below can be implemented.

The autoencoder neural network system 300 is configured to process a ground-truth spectral representation 302 of an audio sample and to generate a perturbed spectral representation 322 of the audio sample. The autoencoder neural network system 300 can be used by a training system to generate training inputs for a vocoder neural network that is configured to process the perturbed spectral representations 322 to generate predictions for the corresponding audio samples. For example, the autoencoder neural network system can act as the perturbation neural network 210 when training the vocoder neural network 220 described above with reference to FIG. 2. The vocoder neural network can then be deployed in a speech synthesis system with a spectral representation neural network, e.g., the spectral representation neural network 110 described above with reference to FIG. 1.

The autoencoder neural network system 300 includes an encoder subnetwork 310 and a decoder subnetwork 320. The encoder subnetwork 310 is configured to process the ground-truth spectral representation 302 and to generate an embedding 312 of the ground-truth spectral representation 302. The decoder subnetwork 320 is configured to process the embedding 312 of ground-truth spectral representation 302 and to reconstruct the ground-truth spectral representation 302 from the embedding 312 to generate the perturbed spectral representation 322. In this specification, an embedding is an ordered collection of numeric values that represents an input in a particular embedding space; e.g., an embedding can be a vector of floating point or other numeric values that has a fixed dimensionality.

In some implementations, the autoencoder neural network system 300 is pre-trained before being deployed in a training system for the vocoder neural network, e.g., the training system 200 depicted in FIG. 2. During the pre-training, the autoencoder neural network system 300 can be configured to generate perturbed spectral representations 322 such that a difference between the ground-truth spectral representations 302 and the corresponding perturbed spectral representations 322 is minimized or reduced below a threshold.

For example, a training system for the autoencoder neural network system 300 can process training examples that include ground-truth spectral representations 302 using the autoencoder neural network system 300 to generate respective perturbed spectral representations 322. For each training example that is processed during training of the autoencoder neural network system 300, the training system can determine a reconstruction error that characterizes a difference between i) the ground-truth spectral representation 302 and ii) the corresponding perturbed spectral representation 322. For example, the reconstruction error can be the L1 or L2 distance between the ground-truth spectral representation 302 and the perturbed spectral representation 322, or squared versions thereof. As another example, the reconstruction error can be the root mean squared error between the ground-truth spectral representation 302 and the perturbed spectral representation 322.

The training system can then backpropagate the reconstruction error through the autoencoder neural network system 300 to determine an update to the values of the network parameters of the autoencoder neural network system 300, e.g., using gradient descent. For example, the training system can determine an update to the values of the network parameters of both the encoder subnetwork 310 and the decoder subnetwork 320 (that is, the encoder subnetwork 310 and the decoder subnetwork 320 can be trained concurrently). In other words, the training system can train the autoencoder neural network system 300 in an unsupervised manner.

In some implementations, the autoencoder neural network system 300 is a variational autoencoder (VAE).

Generally, the embedding 312 has a lower dimensionality than the ground-truth spectral representation 302, while the perturbed spectral representation 322 has the same dimensionality as the ground-truth spectral representation 302. For example, the dimensionality of the embedding 312 can be ⅒th, 1/100th, or 1/1000th the size of the dimensionality of the ground-truth spectral representation 302. That is, there is a loss of information when the ground-truth spectral representation 302 is processed by the encoder subnetwork 310 to generate the embedding 312, and so the perturbed spectral representation 322 is only an approximation of the original ground-truth spectral representation 302. In other words, the perturbed spectral representation 322 is a degraded, or "noisy", version of the ground-truth spectral representation 302.

As described above, the noisy quality of the perturbed spectral representation 322 can be advantageous when using the perturbed spectral representation 322 as a training input for the vocoder neural network. Although in some implementations the autoencoder neural network system 300 has been trained independently from the spectral representation neural network, in some cases, the degradation introduced by the autoencoder neural network system 300 can be similar to the degradation of a predicted spectral representation generated by the spectral representation neural network, relative to a ground-truth spectral representation. Unlike the spectral representation neural network, however, the autoencoder neural network system 300 can process any ground-truth spectral representation 302 corresponding to any speaker, and so the autoencoder neural network system 300 can generate a diverse training data set for the vocoder neural network.

Figure 4:
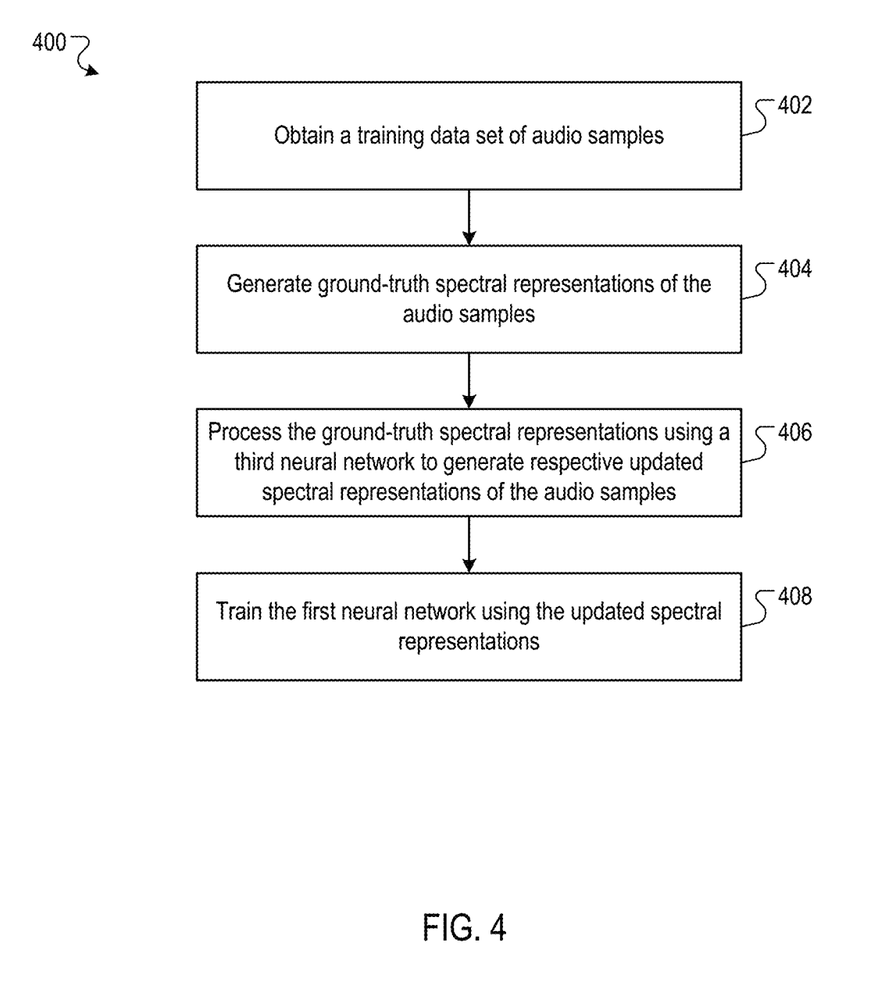
FIG. 4 is a flow diagram of an example process for training a neural network to perform speech synthesis.

FIG. 4 is a flow diagram of an example process 400 for training a first neural network to perform speech synthesis. For convenience, the process 400 will be described as being performed by a system of one or more computers located in one or more locations. For example, a training system, e.g., the training system 200 depicted of FIG. 2, appropriately programmed in accordance with this specification, can perform the process 400.

The first neural network, also called a vocoder neural network in this specification, is configured to process a spectral representation of an audio sample and to generate a prediction of the audio sample. For example, the first neural network can be the vocoder neural network 120 described above with reference to FIG. 1, or the vocoder neural network 220 described above with reference to FIG. 2.

After the first neural network has been trained, the first neural network can be deployed in an inference environment in which the first neural network obtains predicted spectral representations of new audio samples from a second neural network. The second neural network, also called a spectral representation neural network in this specification, is configured to process a text input to generate a predicted spectral representation of a vocalization of the text input. For example, the second neural network can be the spectral representation neural network 110 described above with reference to FIG. 1.

The system obtains a training data set that includes multiple audio samples (step 402).

For one or more audio samples in the training data set, and optionally for each audio sample in the training data set, the system generates a ground-truth spectral representation of the audio sample (step 404).

For each audio sample in the training data set for which a ground-truth spectral representation is generated, the system processes the ground-truth spectral representation of the audio sample using a third neural network to generate an updated spectral representation of the audio sample (step 406). The third neural network, also called a perturbation neural network in this specification, is configured to process ground-truth spectral representations and to generate updated spectral representations that resemble spectral representations generated by the second neural network. For example, the third neural network can be the perturbation neural network 210 described above with reference to FIG. 2.

The system trains the first neural network using the updated spectral representations (step 408). For example, the system can process the updated spectral representations using the first neural network to generate predicted audio samples, and determine a parameter update to the first neural network using a difference between the predicted audio samples and the ground-truth audio samples obtained at step 402.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method of training a first neural network that is configured to process a spectral representation of an audio sample and to generate a prediction of the audio sample,
  wherein, after the first neural network has been trained, the first neural network is configured to obtain the spectral representation of the audio sample from a second neural network,
  wherein the second neural network is configured to process a text input and to generate a predicted spectral representation of a vocalization of the text input,
  the method comprising:
    obtaining a training data set comprising a plurality of audio samples;
    for one or more audio samples in the training data set, and optionally for each audio sample in the training data set:
      generating a ground-truth spectral representation of the audio sample; and
      processing the ground-truth spectral representation of the audio sample using a third neural network to generate an updated spectral representation of the audio sample; and
    training the first neural network using the updated spectral representations,
  wherein the third neural network is configured to (e.g., has been trained to) process ground-truth spectral representations and to generate updated spectral representations that resemble spectral representations generated by the second neural network. In this embodiment the predicted spectral representation of a vocalization of the text input that is generated by the second neural network is or may be provided to the first neural network as a spectral representation of an audio sample to be processed by the first neural network.

Embodiment 2 is the method of embodiment 1, wherein the third neural network is a pretrained autoencoder neural network that has been trained to perform operations comprising:
    obtaining the ground-truth spectral representation of the audio sample;
    processing the ground-truth spectral representation using an encoder subnetwork to generate an embedding of the ground-truth spectral representation; and
    processing embedding of the ground-truth spectral representation using a decoder subnetwork to generate the updated spectral representation of the audio sample. Alternatively the third neural network can have been trained using training examples that each include i) a ground-truth spectral representation of an audio sample representing a vocalization of a text input and ii) a predicted spectral representation generated by the spectral representation neural network in response to processing the text input. Such third neural networks are configured to process ground-truth spectral representations and to generate updated spectral representations that resemble spectral representations generated by the second neural network.

Embodiment 3 is the method of any one of embodiments 1 or 2, wherein the first neural network is configured to (e.g., has been trained to) generate audio samples characterizing any voice.

Embodiment 4 is the method of embodiment 3, wherein the second neural network is only configured to (e.g., has only been trained to) generate predicted spectral representations corresponding to a predetermined set of voices. For example, the second neural network may have been trained using training data for a predetermined set of voices.

Embodiment 5 is the method of any one of embodiments 1-4, wherein the third neural network has been trained by performing operations comprising:
    obtaining a plurality of training examples that each comprise i) a training ground-truth spectral representation of a training audio sample and ii) a training predicted spectral representation of the training audio sample generated by the second neural network;
    for one or more of the training examples, and optionally for each training example:

processing the training ground-truth spectral representation using the third neural network to generate a training updated spectral representation of the training audio sample; and
determining an error between the training updated spectral representation and the training predicted spectral representation; and
generating a parameter update for the third neural network using the determined errors.

Embodiment 6 is the method of any one of embodiments 1-5, further comprising deploying the first neural network and the second neural network in a production setting without the third neural network.

Embodiment 7 is the method of any one of embodiments 1-5, further comprising deploying the first neural network and the second neural network without the third neural network.

Embodiment 8 is the method of any one of embodiments 1-7, further comprising:
training the first neural network and the second neural network jointly; and
finetuning the first neural network using a plurality of updated spectral representations generated by the third neural network.

Embodiment 9 is the method of any one of embodiments 1-7, wherein training the first neural network using the updated spectral representations comprises:
training the first neural network and the second neural network jointly; and
finetuning the first neural network using the updated spectral representations generated by the third neural network.

Embodiment 10 is a method for generating audio samples using a first neural network that has been trained using the method of any one of embodiments 1-9.

Embodiment 11 is the method of embodiment 10, further comprising:
deploying the first neural network and the second neural network without the third neural network as a speech synthesis inference system.

Embodiment 12 is the method of any one of embodiments 10 or 11, further comprising:
providing a text input to the speech synthesis inference system; and
receiving, as output from the speech synthesis inference system, an audio sample representing a prediction of speech corresponding to the input text.

Embodiment 13 is a system comprising one or more computers and one or more storage devices storing instructions that when executed by the one or more computers cause the one or more computers to perform the method of any one of embodiments 1-12.

Embodiment 14 is one or more non-transitory computer storage media storing instructions that when executed by one or more computers cause the one more computers to perform the operations of any one of embodiments 1-12.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially be claimed as such, one or more features from a claimed combination can in some cases be excised from the combination, and the claimed combination may be directed to a sub combination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a first neural network to process a spectral representation of an audio sample and to generate a prediction of the audio sample,
wherein, after the first neural network has been trained, the first neural network is configured to obtain the spectral representation of an audio sample to be processed from a second neural network,
wherein the second neural network is configured to process a text input and to generate a predicted spectral representation of a vocalization of the text input,
the method comprising:
obtaining a training data set comprising a plurality of audio samples;
for one or more audio samples in the training data set:
generating a ground-truth spectral representation of the audio sample; and
processing the ground-truth spectral representation of the audio sample using a third neural network to generate an updated spectral representation of the audio sample; and
training the first neural network using the updated spectral representations,
wherein the third neural network is configured to process ground-truth spectral representations and to generate updated spectral representations that resemble spectral representations generated by the second neural network.

2. The method of claim 1, wherein the third neural network is a pretrained autoencoder neural network that has been trained to perform operations comprising:
obtaining the ground-truth spectral representation of an input audio sample;
processing the ground-truth spectral representation using an encoder subnetwork to generate an embedding of the ground-truth spectral representation; and processing embedding of the ground-truth spectral representation using a decoder subnetwork to generate the updated spectral representation of the input audio sample.

3. The method of claim 1, wherein the first neural network is configured to generate audio samples characterizing any voice.

4. The method of claim 3, wherein the second neural network is only configured to generate predicted spectral representations corresponding to a predetermined set of voices.

5. The method of claim 1, wherein the third neural network has been trained by performing operations comprising:
obtaining a plurality of training examples that each comprise i) a training ground-truth spectral representation of a training audio sample and ii) a training predicted spectral representation of the training audio sample generated by the second neural network;
for one or more of the plurality of training examples:
processing the training ground-truth spectral representation using the third neural network to generate a training updated spectral representation of the training audio sample; and
determining an error between the training updated spectral representation and the training predicted spectral representation; and
generating a parameter update for the third neural network using the determined errors.

6. The method of claim 1, wherein training the first neural network using the updated spectral representations comprises:
training the first neural network and the second neural network jointly; and
finetuning the first neural network using the updated spectral representations generated by the third neural network.

7. The method of claim 1, further comprising deploying the first neural network and the second neural network in a production setting without the third neural network.

8. A method comprising processing a spectral representation of an audio sample using a first neural network to generate a prediction of the audio sample,
wherein the first neural network is configured to obtain the spectral representation of the audio sample from a second neural network,
wherein the second neural network is configured to process a text input and to generate a predicted spectral representation of a vocalization of the text input,
and wherein the first neural network has been trained by performing operations comprising:
obtaining a training data set comprising a plurality of audio samples;
for one or more audio samples in the training data set:
generating a ground-truth spectral representation of the audio sample; and
processing the ground-truth spectral representation of the audio sample using a third neural network to generate an updated spectral representation of the audio sample; and
training the first neural network using the updated spectral representations,
wherein the third neural network is configured to process ground-truth spectral representations and to generate updated spectral representations that resemble spectral representations generated by the second neural network.

9. The method of claim 8, wherein the third neural network is a pretrained autoencoder neural network that has been trained to perform operations comprising:
obtaining the ground-truth spectral representation of an input audio sample;
processing the ground-truth spectral representation using an encoder subnetwork to generate an embedding of the ground-truth spectral representation; and
processing embedding of the ground-truth spectral representation using a decoder subnetwork to generate the updated spectral representation of the input audio sample.

10. The method of claim 8, wherein the first neural network is configured to generate audio samples characterizing any voice.

11. The method of claim 10, wherein the second neural network is only configured to generate predicted spectral representations corresponding to a predetermined set of voices.

12. The method of claim 8, wherein the third neural network has been trained by performing operations comprising:
obtaining a plurality of training examples that each comprise i) a training ground-truth spectral representation of a training audio sample and ii) a training predicted spectral representation of the training audio sample generated by the second neural network;
for one or more of the plurality of training examples:
processing the training ground-truth spectral representation using the third neural network to generate a training updated spectral representation of the training audio sample; and
determining an error between the training updated spectral representation and the training predicted spectral representation; and
generating a parameter update for the third neural network using the determined errors.

13. The method of claim 8, wherein training the first neural network using the updated spectral representations comprises:
training the first neural network and the second neural network jointly; and
finetuning the first neural network using the updated spectral representations generated by the third neural network.

14. The method of claim 8, wherein the first neural network and the second neural network have been deployed in a production setting without the third neural network.

15. A system comprising one or more computers and one or more storage devices storing instructions that when executed by the one or more computers cause the one or more computers to perform operations for training a first neural network to process a spectral representation of an audio sample and to generate a prediction of the audio sample,
wherein, after the first neural network has been trained, the first neural network is configured to obtain the spectral representation of an audio sample to be processed from a second neural network,
wherein the second neural network is configured to process a text input and to generate a predicted spectral representation of a vocalization of the text input,
the operations comprising:
obtaining a training data set comprising a plurality of audio samples;

for one or more audio samples in the training data set:
  generating a ground-truth spectral representation of the audio sample; and
  processing the ground-truth spectral representation of the audio sample using a third neural network to generate an updated spectral representation of the audio sample; and
training the first neural network using the updated spectral representations,
wherein the third neural network is configured to process ground-truth spectral representations and to generate updated spectral representations that resemble spectral representations generated by the second neural network.

16. The system of claim 15, wherein the third neural network is a pretrained autoencoder neural network that has been trained to perform operations comprising:
  obtaining the ground-truth spectral representation of an input audio sample;
  processing the ground-truth spectral representation using an encoder subnetwork to generate an embedding of the ground-truth spectral representation; and
  processing embedding of the ground-truth spectral representation using a decoder subnetwork to generate the updated spectral representation of the input audio sample.

17. The system of claim 15, wherein the first neural network is configured to generate audio samples characterizing any voice.

18. The system of claim 17, wherein the second neural network is only configured to generate predicted spectral representations corresponding to a predetermined set of voices.

19. The system of claim 15, wherein the third neural network has been trained by performing operations comprising:
  obtaining a plurality of training examples that each comprise i) a training ground-truth spectral representation of a training audio sample and ii) a training predicted spectral representation of the training audio sample generated by the second neural network;
  for one or more of the plurality of training examples:
    processing the training ground-truth spectral representation using the third neural network to generate a training updated spectral representation of the training audio sample; and
    determining an error between the training updated spectral representation and the training predicted spectral representation; and
  generating a parameter update for the third neural network using the determined errors.

20. The system of claim 15, wherein training the first neural network using the updated spectral representations comprises:
  training the first neural network and the second neural network jointly; and
  finetuning the first neural network using the updated spectral representations generated by the third neural network.

* * * * *